(12) United States Patent
Bangole et al.

(10) Patent No.: US 9,591,077 B2
(45) Date of Patent: Mar. 7, 2017

(54) CONTENT INTEGRITY CHECKS

(71) Applicant: GOGO LLC, Itasca, IL (US)

(72) Inventors: Premkumar Bangole, Bloomingdale, IL (US); Steven Sobieszek, Addison, IL (US); Anil Achut Rajasekharan, Schaumburg, IL (US)

(73) Assignee: GOGO LLC, Chicago, IL (US)

( * ) Notice: Subject to any disclaimer, the term of this patent is extended or adjusted under 35 U.S.C. 154(b) by 191 days.

(21) Appl. No.: 14/320,970

(22) Filed: Jul. 1, 2014

(65) Prior Publication Data
US 2016/0006807 A1 Jan. 7, 2016

(51) Int. Cl.
G06F 15/16 (2006.01)
H04L 29/08 (2006.01)
G06F 17/30 (2006.01)
G06F 11/14 (2006.01)
G06F 11/00 (2006.01)

(52) U.S. Cl.
CPC ............. *H04L 67/12* (2013.01); *G06F 11/00* (2013.01); *G06F 11/1402* (2013.01); *G06F 11/1464* (2013.01); *G06F 11/1469* (2013.01); *G06F 17/30* (2013.01); *G06F 17/30227* (2013.01); *H04L 67/1095* (2013.01); *H04L 67/1097* (2013.01); *H04L 67/32* (2013.01)

(58) Field of Classification Search
CPC ............. G06F 11/1402; G06F 11/1464; G06F 11/1469; G06F 17/30227; H04L 67/1095; H04L 67/1097; H04L 67/12; H04L 67/32
USPC ................... 707/999.003, 999.005; 717/172; 718/101; 709/219
See application file for complete search history.

(56) References Cited

U.S. PATENT DOCUMENTS

2006/0136903 A1* 6/2006 Childress ............ G06F 11/1464 717/172
2008/0189338 A1* 8/2008 Weaver ............... G06F 11/1402
2009/0106758 A1* 4/2009 Giampaolo ....... G06F 17/30227 718/101

* cited by examiner

*Primary Examiner* — Kyung H Shin
(74) *Attorney, Agent, or Firm* — Marshall, Gerstein & Borun LLP

(57) ABSTRACT

A method for maintaining the integrity of data stored on a storage device being transported by a vehicle comprises detecting a discrepancy between data stored on the storage device and a content inventory, and, upon detecting the discrepancy, analyzing the data stored on the storage device to identify specific portions of the plurality of content that are missing from the data stored on the storage device. The method further includes updating the content inventory to indicate that the specific portions of the plurality of content are missing from the data stored on the storage device, and restoring the identified specific portions of the plurality of content.

20 Claims, 4 Drawing Sheets

CONTENT INTEGRITY CHECKS

CROSS-REFERENCE TO RELATED APPLICATIONS

The present application is related to U.S. patent application Ser. No. 14/320,966 entitled "DELAYED DISK RECOVERY" and filed concurrently herewith, the contents of which are hereby incorporated by reference in their entirety.

FIELD AND BACKGROUND OF THE DISCLOSURE

Technical Field

The instant disclosure generally relates to data management and, in particular, to methods for maintaining the integrity of content stored on devices on-board vehicles, such as aircraft.

Background

Hard disk drives or solid state drives on-board vehicles, such as aircraft, are often housed in a harsh environment. For example, an aircraft can lose power momentarily when pushing back from a gate or when arriving at a gate because of a switch between ground power (e.g., provided by a ground power unit) and aircraft power (e.g., provided by power sources on the aircraft). This switching of power sources or total loss of power can damage drives on-board the aircraft resulting in a loss of data, such as a loss of content (movies, music, etc.) to be distributed to passengers on the aircraft.

Most disk drives go through read and write cycles, and a loss of power to a disk, especially during a write cycle can corrupt the disk. Power on-board vehicles is not predictable, and, thus, corruption or damage to disks is likely. Operating systems and disk utilities can attempt to "recover" a damaged disk (e.g., via repairing partition tables or recovering portions of damaged files). However, the integrity (e.g., presence and accessibility) of individual portions of content may be unknown. To ensure the integrity of content on a corrupted disk, duplicate or replacement files may need to be transferred to the disk, or the disk may need to be physically replaced. Such processes can be costly, both in terms of finances and data communications.

BRIEF SUMMARY OF THE DISCLOSURE

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

In one embodiment, a computer-implemented method for maintaining the integrity of data stored on a storage device being transported by a vehicle comprises detecting, by one or more processors, a discrepancy between data stored on the storage device and a content inventory, wherein the content inventory includes indications of a plurality of content that is to be included in the data stored on the storage device, and, upon detecting the discrepancy, analyzing, by the one or more processors, the data stored on the storage device to identify specific portions of the plurality of content that are missing from the data stored on the storage device. The method further includes updating, by the one or more processors, the content inventory to indicate that the specific portions of the plurality of content are missing from the data stored on the storage device, and restoring, by the one or more processors, the identified specific portions of the plurality of content. The restoring of the specific portions of the plurality of content includes receiving the identified specific portions of the plurality of content from a content source, and storing the identified specific portions of the plurality of content on the storage device.

In another embodiment, a system on-board a vehicle comprises a storage device storing data to be distributed to passenger on the vehicle, and an on-board node including one or more processors and a non-transitory computer-readable medium. The non-transitory computer-readable medium stores thereon instructions that, when executed by the one or more processors, cause the on-board node to detect a discrepancy between the data stored on the storage device and a content inventory, wherein the content inventory includes indications of a plurality of content that is to be included in the data stored on the storage device, and, upon detecting the discrepancy, analyze the data stored on the storage device to identify specific portions of the plurality of content that are missing from the data stored on the storage device. The instructions further cause the on-board node to update the content inventory to indicate that the identified specific portions of the plurality of content are missing from the data stored on the storage device, and restore the identified specific portions of the plurality of content. The restoring of the identified specific portions of the plurality of content includes receiving the identified specific portions of the plurality of content from a content source, and storing the identified specific portions of the plurality of content on the storage device.

In yet another embodiment, a non-transitory computer-readable medium stores thereon instructions that, when executed on one or more processors of a computing device, cause the one or more processors to detect a discrepancy between data stored on a storage device and a content inventory, wherein the content inventory includes indications of a plurality of content that is to be included in the data stored on the storage device, and, upon detecting the discrepancy, analyze the data stored on the storage device to identify specific portions of the plurality of content that are missing from the data stored on the storage device. The instructions further cause the one or more processors to update the content inventory to indicate that the identified specific portions of the plurality of content are missing from the data stored on the storage device, and restore the identified specific portions of the plurality of content. The restoring of the identified specific portions of the plurality of content includes receiving the identified specific portions of the plurality of content from a content source, and storing the identified specific portions of the plurality of content on the storage device.

DETAILED DESCRIPTION OF THE PREFERRED EMBODIMENTS

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Any or all of the contents of the present disclosure may operate in conjunction with any or all of the contents of the disclosures of co-pending U.S. patent application Ser. No. 13/675,200 entitled "VEHICLE DATA DISTRIBUTION SYSTEM AND METHOD," co-pending U.S. patent application Ser. No. 13/675,194 entitled "COMMUNICATIONS SYSTEM AND METHOD FOR NODES ASSOCIATED WITH A VEHICLE, and co-pending U.S. patent application Ser. No. 13/675,190 entitled "GROUND SYSTEM FOR VEHICLE DATA DISTRIBUTION," the contents of which are hereby incorporated by reference in their entireties.

Additionally, any or all of the contents of the present disclosure may operate in conjunction with any or all of the contents of the disclosures of co-pending U.S. patent application Ser. No. 14/225,077 entitled "OPTIMIZING USAGE OF MODEMS FOR DATA DELIVERY TO DEVICES ON VEHICLES," co-pending U.S. patent application Ser. No. 14/225,017 entitled "HYBRID COMMUNICATIONS FOR DEVICES ON VEHICLES," and co-pending U.S. patent application Ser. No. 14/225,050 entitled "DATA DELIVERY TO DEVICES ON VEHICLES USING MULTIPLE FORWARD LINKS," the contents of which are hereby incorporated by reference in their entireties.

On-board System

Figure 1:
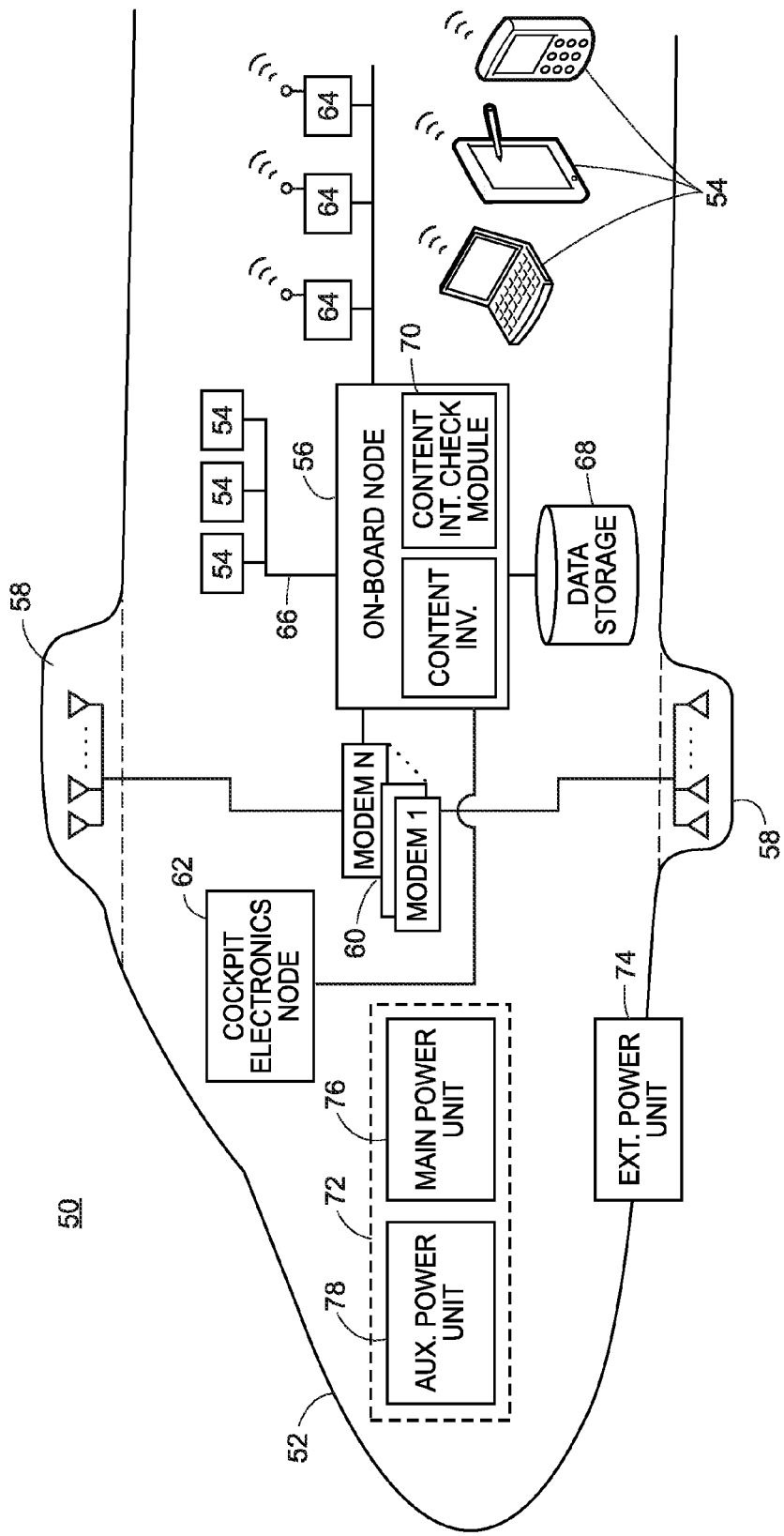
FIG. 1 is a block diagram of an example system on-board a vehicle that is configured to perform checks to ensure the integrity of content stored on an on-board data storage entity.

FIG. 1 illustrates an example on-board system 50 in a vehicle 52, such as an aircraft, that may perform checks to ensure the integrity (e.g., presence and accessibility) of content stored on an on-board data storage entity 68, as discussed herein. The on-board system 50 may attempt to restore content on the on-board data storage entity 68, such that it is useable by the on-board system 50, while maintaining records of missing, present, available, not available, etc. content stored on the on-board data storage entity 68.

The on-board system may further receive information or data onto the vehicle 52 (e.g., information or data provided by a terrestrial data center or other suitable information distributor), store the information or data (e.g., on the on-board data storage entity 68), and cause information to be delivered from the vehicle 52, e.g., to a terrestrial data center or other remote computing device(s). Further details of a communications system, in which the vehicle 52 may operate so as to receive/communicate data, are discussed with reference to FIG. 2. The on-board system 50 may also cause data (e.g., stored on the on-board data storage entity 68) to be delivered to and/or received from one or more devices 54 being transported by the vehicle 52. The example on-board system 50 includes an on-board node 56, such as an ABS Central Processing Unit (ACPU), that may be a computing device communicatively connected to one or more external communication links via one or more antennas 58 and one or more modems or transceivers 60.

Each of the one or more antennas 58 may receive and transmit signals via a different respective frequency band allocated for wireless communications, e.g., the $K_a$ band, the L band, the $K_u$ band, the WiMAX band, the Wi-Fi band, a terrestrial cellular band, or any other suitable wireless communication frequency band. Each of the antennas 58 may be communicatively connected to an associated modem or transceiver 60 that is fixedly connected to the vehicle 52 and is configured to encode and decode information and data corresponding to signals at the respective antenna 58, in an implementation. The one or more modems or transceivers 60 may include a respective modem or transceiver that is compatible with TDMA (Time Division Multiple Access), GSM (Global System for Mobile Communications), CDMA (Code Division Multiple Access), LTE (Long Term Evolution) communications, WiMAX, and/or any other terrestrial mobile communications technology. In some embodiments, the one or more modems 60 may include a respective modem or transceiver that is compatible with EVDO (Evolution Data Optimized) or Wi-Fi communications technologies. It is clear, however, that the on-board system 50 may include any number of antennas 58 and any different number of associated modems or transceivers 60 to support any desired number of different wireless communication technologies.

In addition, when the vehicle 52 is an aircraft, a cockpit electronics node 62 may be communicatively coupled to the one or more modems 60. The cockpit electronics node 62 may be a LRU configured to collect electronic information from various instruments in the cockpit of the aircraft, e.g., during flight. In some cases, the cockpit electronics node 62 may provide collected flight information such as altitude, airspeed, aircraft position, or other flight state information to the on-board node 56 (which may subsequently store the information on the on-board data storage entity 68) or directly to a computing device disposed at a terrestrial location, e.g., via a designated return link.

At least some of the devices 54 may be mobile computing devices such as smartphones, tablet computers, laptop computers, personal digital assistants, e-readers, etc. that are capable of establishing a wireless communicative connection with the on-board node 56 via one or more wireless access points 64, e.g., via a wireless network interface. Some of the devices 54 may be wired computing devices that are communicatively connected to the on-board node 56 via a wired network 66.

In an embodiment, each of devices 54 may include an instance of a vehicle travel application (VTA) installed thereon and particularly configured to support services while the respective device 54 is being transported by the vehicle 52, e.g., when the vehicle 52 is traveling en route between ports. For example, the vehicle travel application may be configured to serve as the on-board end of a data tunnel that is established with the on-board node 56, the on-board data storage entity 68, or a terrestrial data center or other remote computing device(s) and/or networks. In an embodiment, the vehicle travel application may communicate with other applications installed on a particular one of the devices 54 (e.g., native terrestrial applications) so that the other applications may operate as desired (e.g., in a native manner) while the one of the devices 54 is being transported by the vehicle 52.

The on-board data storage entity 68 may store various types of data which may be distributed to and/or received from other devices 54 via the VTA, e.g., entertainment content (movies, music, etc.), web pages, account information, usage data, applications that may be installed, information identifying the devices 54, payment information (e.g., encrypted financial account information), digital rights management (DRM) keys, and/or any other data that is desired to be stored, at least temporarily, on-board the vehicle 52. The data storage entity 68 may include one or more non-transitory, tangible computer readable storage media. For example, the data storage entity 68 may include FLASH memory (e.g., "solid state" drives) or hard disk drives.

Various components of the system 50, such as the on-board data storage entity 68 and the on-board node 56, may be powered to operate by a combination of a number of on-board power sources 72 on the vehicle 52 and an external power input 74 to the vehicle. At a certain stage or interval of travel (e.g., on the ground, cruising altitude, etc. in the case of an aircraft), components of the system 50 may be powered by a different one of the on-board power sources 72 and the external power input 74 than at other intervals of travels. For example, when an aircraft is on the ground and shuts down one or more jet engines (i.e., a main power source), the aircraft may switch from a main power unit 76 to an auxiliary power unit 78 or to the external power input 74.

The main power unit 76 of the vehicle 52 may include various electrical components which generate and utilize electricity (alternating current, direct current, voltages, etc.) based on the operation of engines/motors that primarily provide propulsion (e.g., mechanical energy) to the vehicle 52. The electrical components may include generators, power control and conversion components (transformers, rectifiers, etc.), power distribution components (electrical leads, switches, buses, etc.), etc. For example, in the case of the vehicle 52 being an aircraft, the main power unit 76 may include a generator that converts a mechanical input from the aircrafts jet or propeller engines (primarily providing propulsion for the aircraft) to current/voltage for the operation of a variety of on-board electronic components (e.g., the data storage entity 68).

The auxiliary power unit 78 may include various electrical components, such as generators, power control components, etc., that primarily provide current/voltage to components on-board the vehicle 52 for functionality other than propulsion. In an implementation, the auxiliary power unit 78 may be configured to provide power to the on-board node 56, the on-board data storage entity 68, etc. when one or more main propulsion engines/motors of the vehicle 52 are shut down. For example, the auxiliary power unit 78 of an aircraft may power the on-board node 56, the on-board data storage entity 68, etc. along with other components, such as air-conditioning equipment, hydraulic equipment, etc. before and after the jet engines of an aircraft are operating (e.g., at a gate of an airport).

The external power input 74 may also provide electricity to components on-board the vehicle 52 for functionality other than propulsion. However, in some implementations, the external power input 74 may receive a current/voltage signal from a power source external to the vehicle 52 that causes electrical components inside of the vehicle 52 to operate. For example, when an aircraft reaches a gate of an airport, the external power input 74 of the aircraft may be removably coupled to a ground power unit (GPU) or other external power source to power the on-board node 56, the on-board data storage entity 68, etc. when one or more main propulsion engines/motors of the aircraft are shut down.

Generally, a vehicle may include any type and number of suitable sources of power for various stages or intervals of travel. A vehicle may include any number of external power inputs, auxiliary power units, main power units, or other types of power units to power the on-board node 56, the on-board data storage entity 68, etc. along with other components, such as air-conditioning equipment, hydraulic equipment, etc. However, a vehicle may alternatively or additional include other types of power units such as air turbines, solar panels, fuel cells, etc., and a vehicle may include various power/energy management components shared by more than one power unit or source, such as transformers, rectifiers, batteries, power management systems, etc. Although not shown in FIG. 1, the vehicle 52 may include any number and configuration of electrical leads or other power distribution components to transfer current/voltage from the on-board power sources 72 and the external power input 74 to components of the vehicle 52.

In some scenarios, such as when the vehicle 52 transitions from one travel interval (e.g., "parked") to another travel interval (e.g., "above service altitude"), the vehicle 52 may switch (e.g., mechanically and/or electrically) from one of the on-board power sources 72 and the external power input 74 to another of the on-board power sources 72 and the external power input 74. During such a transition, some of the components of the vehicle 52, such as the on-board data storage entity 68 may temporarily lose power. For example, when "pulling back" from an airport gate or when arriving or parking at an airport gate, an aircraft may switch from the main power source 76 to the external power input 74, and the on-board data storage entity 68 may be temporarily without power.

The on-board node 56 may include a content integrity check module 70 to check, verify, and track the "integrity" (e.g., presence and accessibility) of data stored on the on-board data storage entity 68. In certain scenarios, such as in the scenario described above, the on-board data storage entity 68 may be damaged or corrupted by a temporary loss of power, and the content integrity check module 70 may determine discrepancies between the data stored on the on-board data storage entity 68 and a content inventory 71, where the content inventory indicates content that is required to be or ideally stored on the on-board data storage entity 68. In an embodiment, the content integrity check module 70 may comprise a set of computer executable instructions that are stored on a non-transitory, tangible computer-readable storage media (e.g., a memory) and are executable by one or more processors of the on-board node 56.

The content inventory 71 may include multiple files (or other organizations of data) tracking the transfer of content (movies, etc.) onto the on-board data storage entity 68 and the presence/absence of those files on the on-board data storage entity 68, in an implementation. For example, a "summary" file in the content inventory 71 may include an indication of the presence or absence of a plurality of content (e.g., a plurality of files) in the Extensible Markup Language (XML). The content inventory 71 may, alternatively or additionally, include a "journal" file maintaining a record of transfers of data onto the on-board data storage entity 68 along with more detailed information about each transfer and corresponding file, such as file size, amount transferred, availability of the file, etc.

Using the content inventory 71, the content integrity check module 70 may perform a quick (e.g., computationally efficient) check for discrepancies. For example, the content integrity check module 70 may perform a comparison between file names, file sizes, file characteristics (e.g., types), etc. to determine if discrepancies exist between data stored in the on-board data storage entity 68 and indications in the content inventory 71. If discrepancies exist, the content integrity check module 70 may perform a more detailed analysis of the data stored in the on-board data storage entity 68 (file-by-file, block-by-block, byte-by-byte, etc.) to identify specific portions of data (e.g., files or portions of files) that are missing or inaccessible on the on-board data storage entity 68. The content integrity check module 70 may also initiate, based on the detection of discrepancies and/or more detailed analysis, a restoration of missing or inaccessible content on the on-board data storage entity 68. Such a restoration, may include copying content to the on-board data storage entity 68, deleting content on the on-board data storage entity 68, completing previously initiated transfers of data on the on-board data storage entity 68, etc., as further discussed with reference to FIG. 3.

Communication System Overview

Figure 2:
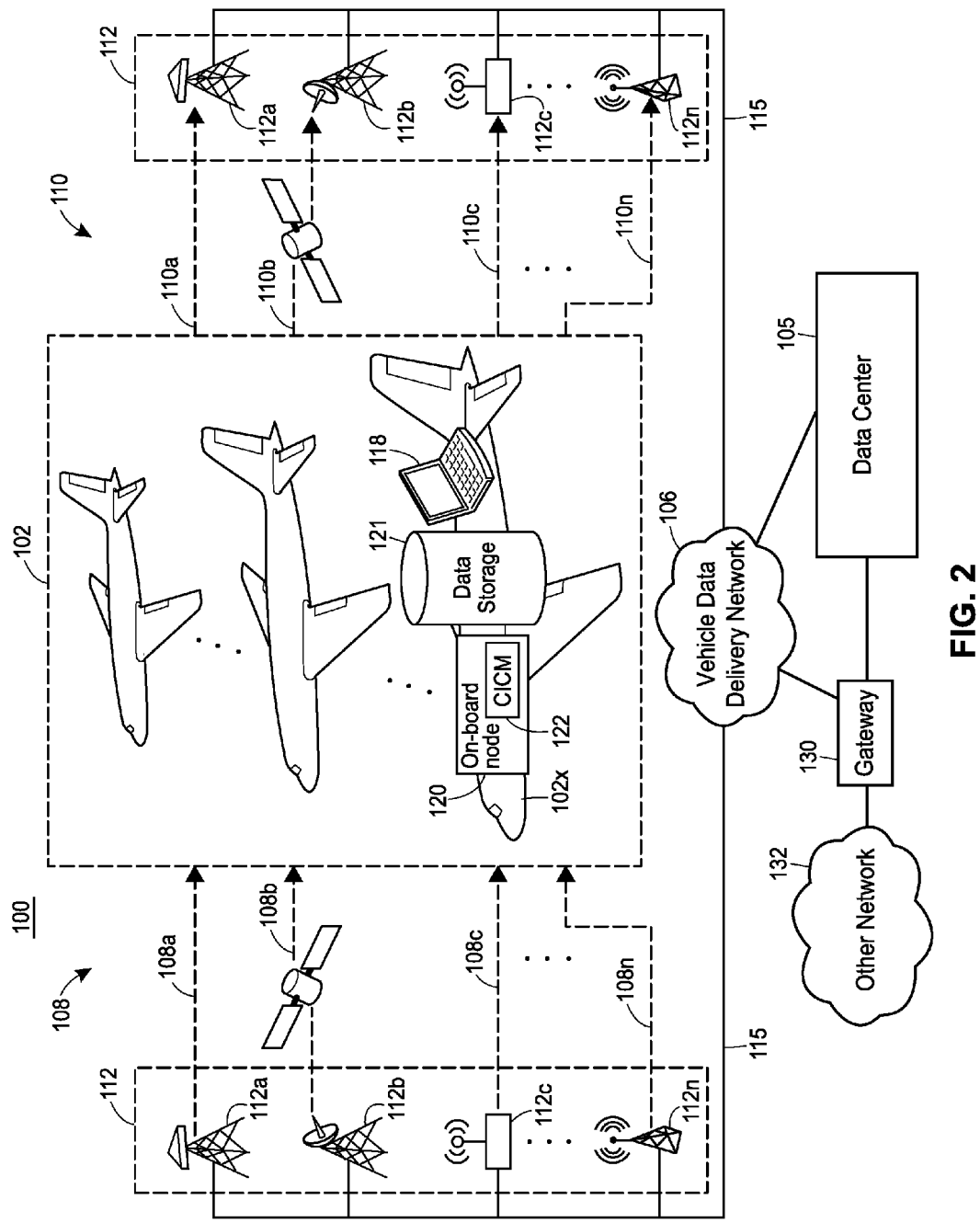
FIG. 2 illustrates an exemplary communications system for delivering data to and from devices that are on-board a set of vehicles, such as the vehicle illustrated in FIG. 1.
Figure 3:
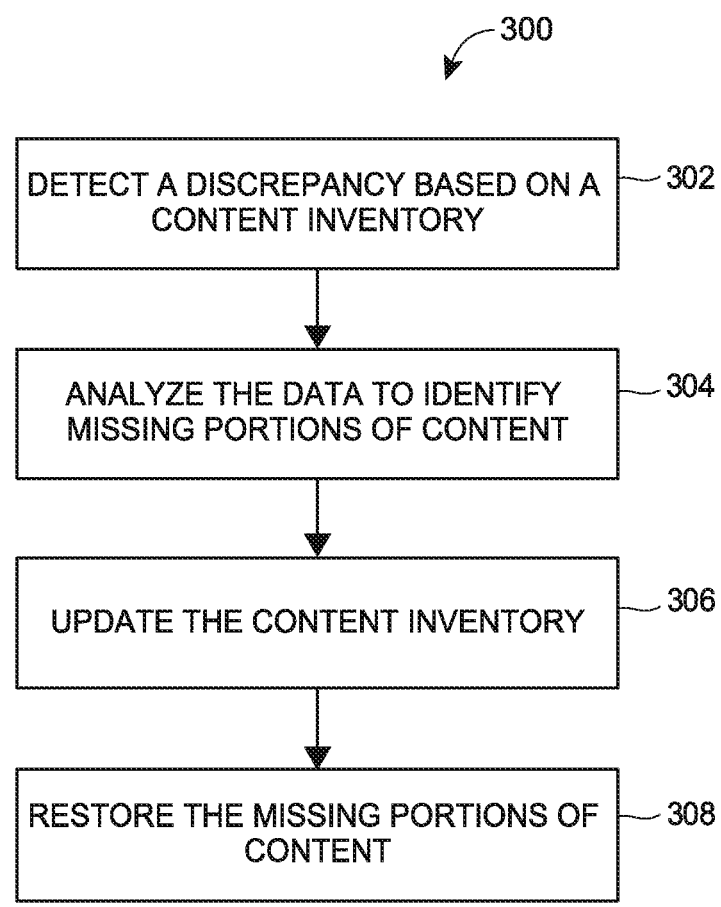
FIG. 3 is a flow diagram of an example method for checking the integrity of content on a data storage entity which can be implemented in the systems illustrated in FIGS. 1 and 2.

FIG. 2 is a block diagram depicting an example communications system 100 in which the vehicle 52 (illustrated in FIG. 1) may operate and implement the content integrity check methods discussed further with reference to FIG. 3.

The system 100 is configured to deliver data, information, or content to a specific device on-board one of a plurality of vehicles 102 (e.g., a device 118, such as one of the device 54, on-board the vehicle 102x) from a data center 105, which data, information, or content may be stored or utilized on-board the vehicles 102. In some implementations, the communications system 100 is also configured to deliver feedback information from the vehicle 102x to the data center 105, and the data center 105 may use the feedback information to generate records of data usage, track availability (e.g., "integrity") and health of storage devices, inform subsequent data delivery to the on-board device 118 or to other on-board devices, etc. In an embodiment, the data center 105 is communicatively connected to the vehicles 102 via one or more vehicle data delivery networks 106, one or more forward links 108, and one or more reverse links 110.

One or more of the vehicles 102 may be owned and/or operated by a specific individual. In some cases, one or more of the vehicles 102 may be owned and/or operated by a company, organization or government entity. For example, the vehicles 102 may include a fleet of vehicles that are used to transport passengers who pay for or otherwise are granted passage on one of the vehicles of the fleet. The vehicles 102 may include one or more vehicles that are used by an organization to transport employees and their guests, in some situations. One or more of the vehicles 102 may be used to transport live or inanimate cargo, packages, mail, and/or other types of cargo. It is noted that although FIG. 1 depicts the vehicles 102 as being airplanes, the techniques and principles described herein equally apply to other types of vehicles such as trucks, automobiles, busses, trains, boats, ships, barges, subway cars, helicopters or other types of aircraft, ambulances or other emergency vehicles, military vehicles, other air-borne, water-borne, or land-borne vehicles, and vehicles that are suitable for space travel.

Each of the vehicles 102 may be communicatively connected to the data center 105 via one or more forward wireless communication links 108 and one or more reverse wireless communication links 110. The links 108, 110 may be collectively supported by a multiplicity of radio frequency (RF) bands. Typically, a particular frequency band or portion of RF spectrum supporting the links 108, 110 is allocated (e.g., by a governmental or regulatory body) for a particular type of wireless communications such as satellite communications, communications, terrestrial cellular communications, near-field wireless communications, ham-radio, and the like. In some allocated frequency bands, the wireless communications may be transmitted over a forward link and a corresponding reverse link using a respective wireless communication protocol that is defined, designated or otherwise indicated by a standards association and/or by a government or other regulatory body. A particular frequency band may support a point-to-point wireless protocol and/or may support a broadband wireless protocol, for example.

Each frequency band may include one or more channels. The channels may be formed, defined or allocated by frequency division, time division, code division, some other suitable channel division, or some combination of divisions. Signals that are carried on a channel may or may not be multiplexed. Any one or more channels included in a frequency band may support (or may be designated to support) a forward link and/or a reverse link for wireless communications. Additionally, any one or more of the channels included in a frequency band may be used to deliver signaling, data payload, or a combination of signaling and data payload. For example, a particular frequency band may support an in-band protocol in which signaling and payload are transmitted over a same channel within the band, and/or the particular frequency band may support an out-of-band protocol in which the signaling and payload are respectively transmitted over different channels within the band.

A transceiver or modem, such as one of the modems 60, that is fixedly connected to a vehicle 102x may be tuned to a particular frequency band, and thus, along with a respective antenna, may serve as one end of a communication link over which data may be received onto and/or sent from the vehicle 102x. Similarly, a transceiver or modem that is fixedly connected to a structure 112 external to the vehicle 102x may also be tuned to the particular frequency band, and thus, along with a respective antenna, may serve as the other end of the communication link over which the data is received onto and/or sent from the vehicle 102x. The structure 112 that supports the non-vehicle end of the communication link may be, for example, an entirely stationary terrestrial structure such as a building or tower on the ground, a relatively stationary terrestrial structure such as a barge in an ocean, or a non-terrestrial structure such as a satellite or other structure in space. In FIG. 1, the representations of the structures 112 are duplicated to more clearly illustrate the forward links 108 and reverse links 110, however, in practice, each structure 112 may be a unitary structure having a single physical transceiver or modem mounted thereon that services both the respective forward link 108 and the respective reverse link 110. For example, a teleport 112*b* may include a transceiver that services both the satellite forward link 108*b* and the satellite reverse link 110*b* of a particular frequency band allocated for satellite communications. In some instances, a single structure 112 may include multiple transceivers or modems, each of which may be tuned to a different frequency band.

With further regard to the structures 112, in addition to having a transceiver or modem supporting one end of a particular communication link 108, 110 to the vehicle 102*x*, each structure 112 may include another interface via which a communication path 115 to the data center 105 may be communicatively connected. The interface to the communication path 115 may be a wired or a wireless communications interface.

Data delivered to the device 118 via the communication system 100 may include any type of data. For example, the data may include user-consumable content data such as a text message, a web page, a media file, streaming data, and/or a response to a previous request received at a user interface of the device 118. In some cases, the data that is to be delivered to the device 118 includes data that is to be presented at a user interface of the device 118. In some scenarios, the data that is to be delivered to the device 118 may be an application, a configuration, an update, or software that the user of the device 118 has requested to be downloaded. In any case, the on-board node 120 may request the data after checking the integrity of the data storage entity 121 (e.g., via the content integrity check module 122) so as to restore missing, lost, or corrupted data on the data storage entity 121.

In general, the data center 105 may utilize any suitable combination of selected forward links 108, reverse links 110, messaging protocols, and/or delivery schemes to transmit data to and receive feedback information from the vehicles 102. Further details of the data center 105 are discussed in more detail in later sections of this disclosure.

Turning now to the vehicles 102, some or all of the vehicles 102 (e.g., the vehicle 102*x*) may each include the respective on-board node 120 to manage and store data that is received onto the vehicle 102*x* and that is intended for delivery to a particular on-board device 118. The on-board node 120 may also manage data that is generated by the on-board devices 118 and that is to be transmitted from the vehicle 102*x*, in an implementation. Further, within the vehicle 102*x* itself, the on-board node 120 may manage communications of said data to and from a data storage entity 121 and the on-board devices 118, e.g., by using one or more communication networks that are contained within the vehicle 102*x* as further illustrated in FIG. 1. In an embodiment, the on-board node 120 is included in an on-board data distribution system or device such as the data distribution device described in aforementioned co-pending U.S. patent application Ser. No. 13/675,200 entitled "VEHICLE DATA DISTRIBUTION SYSTEM AND METHOD."

In some cases, the on-board node 120 may include the content integrity check module 122 (or "CICM") to check data on the data storage entity 121 for content that is to be stored on the data storage entity 121, as further discussed with reference to FIG. 1. In an embodiment, the content integrity check module 122 may also cause summary files, log files, error files, journal files, or other records of data transfer, restoration, presence/absence, etc. in the data storage entity 121 to be communicated to the data center 105. In this manner, the data center 105 may maintain a record of the health and availability of data storage entities (such as the data storage entity 121) on the vehicles 102, errors on data storage entities on the vehicles 102, the availability of certain portions of data stored on data storage entities on the vehicles 102, etc.

In an embodiment, at least a portion of the vehicle data delivery network 106 may be disposed in a terrestrial location, e.g., a packet network router, an optical switch, etc. may be located within a climate-controlled structure on the ground. In an embodiment, at least a portion of the vehicle data delivery network 106 may be disposed in a non-terrestrial location, e.g., a routing node may be disposed on a satellite or aircraft. The vehicle data delivery network 106 may include a public network, a private network, or some combination of one or more public networks and one or more private networks. The vehicle data delivery network 106 may include a communications network, a data network, a packet network, or some combination thereof. The vehicle data delivery network 106 may include a hosted network, or may be a peer-to-peer or other type of ad-hoc network. Indeed, the vehicle data delivery network 106 may use any known networking technology or combination(s) thereof for delivering data. For example, the vehicle data delivery network 106 may use any known networking technology or combination(s) thereof for delivering data between the one or more structures 112 and the data center 105. Generally, the vehicle data delivery network 106 may include a plurality of computing devices that are communicatively connected. One or more portions of the vehicle data delivery network 106 may be included in the ground based system described in the aforementioned co-pending U.S. patent application Ser. No. 13/675,190 entitled "GROUND SYSTEM FOR VEHICLE DATA DISTRIBUTION," in an embodiment.

The data center 105 may be communicatively connected to the vehicle data delivery network 106, and may include one or more computing devices in communicative connection so that they collectively appear, to other networks and/or computing devices, as a single logical entity. The data center 105 may be located at least partially in a terrestrial environment, e.g., in one or more stationary buildings or structures. For example, one or more portions of the data center 105 may be included in a ground distribution network, such as the ground distribution network described in aforementioned co-pending U.S. patent application Ser. No. 13/675,190. In an embodiment, at least a portion of the data center 105 may be located in a non-terrestrial environment, e.g., on an aircraft, satellite, or space station. It is clear, however, that the data center 105 may be located in any suitable environment, whether stationary, mobile, in a vehicle, terrestrial, or non-terrestrial. In an embodiment, multiple data centers 105 may be included in the communications system 100 for servicing different types of data, different customers, different geographical areas, or any other desired or suitable differentiations.

The data center 105 may also be communicatively connected via one or more gateways 130 to one or more other networks 132. Generally, a gateway 130 may include one or more computing devices in communicative connection, and may serve as a boundary between the communications system 100 and one or more other networks 132. In some embodiments, at least some of the computing devices included in the gateway 130 may also be included in the data center 105. The one or more other networks 132 in communicative connection with the gateway 130 may include, for example, the Internet, a PSTN (Public Switched Telephone Network), and/or some other public network. Additionally or alternatively, the one or more other networks 132 may include one or more private networks. The one or more networks 132 may include any number of wired and/or wireless networks. Although FIG. 1 illustrates the data center 105 being connected to one other network 132 via one gateway 130, the techniques and principles described herein equally apply to communications systems 100 having and/or being in communicative connection with any desired number of other networks 132 via any number of gateways 130. In some embodiments of the system 100, the gateway 130 may be omitted.

In an embodiment, the other network 132 may provide data, e.g., via the gateway 130 or via a direct connection, that is to be delivered to a particular device 118 that is on-board a vehicle 102x or stored on the data storage entity 121. In an example, the other network 132 is communicatively connected, via a gateway 130, to one or more computing devices, such as the web server 109, that host a website which a user of the device 118 requests access, and information associated with the website (e.g., the web page, objects, and links thereon) is to be delivered to the device 118 for presentation on a user interface of the device 118 in response to the user request. In yet another example, the other network 132 is communicatively connected to a streaming media provider, and a streamed video file is the data is to be delivered to the on-board device 118 for consumption by the device's user at a user interface. Of course, any type of data may be provided to the data center 105 by any other network 132 or content provider (via the gateway 130, if necessary) for delivery to an indicated device 118 on-board the vehicle 102x or for storage on the data storage entity 121, e.g., text messages, web pages, media content, streaming data, a response to a previous request received at a user interface of the device 118, data that is to be presented at a user interface of the device 118, an application, a configuration, or other software that the user of the device 118 has requested to be downloaded from the other network 132. Additionally, return data or information from the on-board device 118 (e.g., an activation of a user control, a return text message, a request or command, etc.) that is received at the data center 105 may be delivered (via the gateway 130, if necessary) to the other network 132.

Content Integrity Check

FIG. 3 is a flow diagram of an example method 300 for checking the integrity of data stored on a device being transported by a vehicle and restoring missing portions of content on the device. The method 300 may be implemented by the on-board node 56 or the on-board node 120, for example.

To begin, a discrepancy is detected between data stored on a data storage entity, such as the data storage entity 68, and a content inventory (block 302). In one scenario, upon an initialization (e.g., "boot-up") of the on-board node 56, the on-board node 56 may execute the content integrity check module 70. Alternatively, the on-board node 56 may execute the content integrity check module 70 after attempting to transfer new or different content onto the data storage entity 68 or after a loss or power to the data storage entity 68. Generally, an on-board node could initialize the checking of the integrity of a data storage device (e.g., by checking for discrepancies) at any suitable time, such as periodically, during certain stages or intervals of travel of a vehicle, after switching power sources, etc.

In some implementations, the on-board node 56 may first check that the data storage entity 68 is available for a check of the integrity of data stored on the device, prior to block 302. For example, due to lower temperatures (e.g., in winter) the data storage entity 68 may not be powered on or active because of certain temperature ranges of lubricating oils. In such cases, the on-board node 56 may delay the start of the method 300 (e.g., block 302) until a process (e.g., part of an operating system) indicates that the data storage entity 68 is available.

To detect a discrepancy, the content integrity check module 70 may compare one or more files in the content inventory 71 to data actually stored on the data storage entity 68. For example, a "summary" file in the content inventory 71 may include a list of content by name, file size, file type, etc. that should be (e.g., to provide certain functionality of the system 50) stored on the data storage entity 68, and, thus, the content integrity check module 70 may compare file names, file sizes, etc. between the summary file and the data actually stored on the data storage entity 68. In one scenario, a summary file may include a list of movies that should be stored on the data storage entity 68 such that the on-board node 56, or other computing device, may distribute the movies to passengers on the vehicle 52 as part of an on-board subscriber-type multimedia service. The content integrity check module 70 may compare file names of the movies (e.g., "the_godfather.avi" or "pulp_fiction.mp4") with file names of files stored on the data storage entity 68.

In some implementations, the content integrity check module 70 may utilize a more in-depth recordkeeping file to detect discrepancies. For example, a "journal" file in the content inventory 71 may include detailed indications of amounts of files transferred to the data storage entity 68, file sizes, timestamps, etc. In one scenario, the content integrity check module 70 may utilize a journal file to detect discrepancies by analyzing file sizes of files stored on the data storage entity 68 and comparing those file sizes to indications in the journal file indicating amounts of content transferred to the data storage entity 68 and corresponding file sizes. For example, the journal file may indicate that 80% of a "casablanca.avi" file has been transferred to the data storage device 68 (e.g., via a forward link or other suitable data link), where the "casablanca.avi" file has a total size of 1.1 GB. The content integrity check module 70 may detect no "casablanca.avi" file or a "casablanca.avi" file with an unexpected size (e.g., less/more than 80% of 1.1 GB) and, as such, may detect a discrepancy between the data stored on the data storage entity 68 and the journal file.

Generally speaking, the content integrity check module 70 may analyze file sizes, file names, file types, or any other suitable properties of data to detect discrepancies. Further, although such detection with reference to one or two individual files are given above by way of example, a content integrity check module may detect discrepancies by analyzing any number of files or other segmentations of data, such as directory structures, symbolic links, etc., in reference to a content inventory. In some implementations, a content integrity check module may analyze all data indicated in a content inventory to detect one or many discrepancies. However, in other implementations, a content integrity check module may only analyze data indicated in a content inventory until one or a certain number of discrepancies are detected, at which point the flow may continue to block 304.

After detecting one or more discrepancies, data stored on the data storage entity is analyzed to identify specific portions of content that are missing from the data storage entity (block 304). That is, at block 302, the content integrity check module 70 may detect whether or not one or more discrepancies exist between the content inventory 71 and the data stored on the data storage entity 68, and then, at block 304, the content integrity check module 70 may analyze the data stored on the data storage entity 68 to determine which specific portions of content are missing from the data storage entity 68. In the scenario discussed above, the content integrity check module 70 may detect a discrepancy based on the file name "the_godfather.avi," and, subsequently, the content integrity check module 70 may analyze all files, directories, or other structures on the data storage entity 68 to determine that the data storage entity 68 is completely missing "casablanca.avi," "frankenstein.avi," and three other movies in addition to "the_godfather.avi."

The analysis of data stored on the data storage entity to identify specific portions of content may include a file-by-file, block-by-block, byte-by-byte, or otherwise systematic and detailed analysis of the data stored on the data storage entity, in some implementations. In some scenarios, for example, data stored on the data storage entity may be corrupted (e.g., by a loss of power) such that only portions of a file, or other data structure, may be missing or inaccessible. As such, the content integrity check module 70 may analyze data block-by-block, or in any other suitable systematic and detailed manner, so as to identify specific portions (e.g., blocks or bytes) of data that are missing or inaccessible (e.g., unable to be utilized). In this manner, the content integrity check module 70 may identify specific portions of content that need to be replaced, deleted, recovered (e.g., via a data recovery process), or otherwise manipulated to maintain the integrity of the data on the data storage entity 68.

Based on the identification of specific portions of data, a content inventory may be updated to accurately reflect data actually stored on the data storage entity (block 306). For example, if a summary file of a content inventory indicates that a certain file is present in data stored on the data storage entity 68 while the content integrity check module 70 identifies the certain file as missing, the content integrity check module 70 may update the summary file to indicate the absence of the certain file. Likewise, if a journal file indicates a "complete" transfer of a certain file to the data storage entity 68 while the content integrity check module 70 identified only a portion of the certain file or an absence of the certain file, the content integrity check module 70 may update the journal file to indicate a "failed" transfer of the certain file or that the certain file is "not available." In some implementations, a "not available" state is in intermediate state of a file which may be changed to "failed" or "complete" after a data recovery is initiated.

The identified missing or inaccessible portions of data on the data storage entity may also be restored (block 308). The content integrity check module 70 may initiate a transfer of content onto the data storage entity 68 to restore the identified portions of content. In one scenario, upon detecting a complete absence of a movie, "the_godfather.avi," on the data storage entity 68, the content integrity check module 70 may initiate a transfer of "the_godfather.avi" to the data storage entity 68 such that the movie is no longer missing. Further, in some cases, the content integrity check module 70 may, by way of the transfer of data partially or fully overwrite incomplete, corrupted, or otherwise compromised files on a data storage entity 68. For example, if the content integrity check module 70 identify "the_godfather.avi" as being incomplete (i.e., lacking a complete copy of the movie), the content integrity check module 70 may overwrite the existing "the_godfather.avi" on the data storage entity 68 with a newly transferred copy of "the_godfather.avi." Generally, a content integrity check module may fully/partially overwrite, replace, delete, move, or otherwise manipulate existing files on a data storage entity so as to correct identified missing or inaccessible portions of data. For example, a content integrity check module may perform a Cyclic Redundancy Check (CRC) check followed by an execution of a md5sum program, where a discrepancy detected by the md5sum execution is indicative of a corrupt data storage entity.

In some implementations, the content integrity check module 70 or content integrity check module 122 may initiate or request transfers of data onto the data storage entity 68 from a content source or system external to the vehicle 52. For example, the content integrity check module 122 may request that one or more missing files (e.g., a movie) on the data storage entity 121 be transferred from the data center 105 to the vehicle 102*x*, where the missing files may be subsequently stored on the data storage entity 121. The data center 105 may satisfy such requests at any suitable time while the vehicle 102*x* is moving or stationary. For example, upon identifying missing files during a flight of the vehicle 102*x*, the content integrity check module 122 may request the missing files from the data center 105 via one of the reverse links 110. Subsequently, the data center 105 may upload the missing files to the vehicle 102*x* via one of the forward links 108. The on-board node 120 may receive the missing files and cause the missing files to be stored on the data storage entity 121, thus maintaining the integrity of the content stored on the data storage entity 121.

In other implementations, the content integrity check module 70 or content integrity check module 122 may restore missing or otherwise comprised files by transferring data from a removable content source removably attached to the on-board node 56 or the on-board node 120. When at a gate or port, an employee of a multimedia service company (e.g., providing multimedia entertainment services on the vehicle 52) may "plug in" or removably couple a computer readable medium to the on-board node 56. The removable computer readable medium, or content source, may be a USB flash drive, for example. Once coupled, the content integrity check module 70 may initiate a transfer of data from the removable computer readable medium to the data storage entity 68 to restore missing or otherwise compromised (inaccessible, corrupted, etc.) content.

In some scenarios, a power loss (as further described with reference to FIG. 1) may interrupt a transfer of content to a data storage entity, such as the data storage entity 68, whether the transfer was initiated by the content integrity check module 70 or by another process. In such cases, loss of data or corruption of data is likely. As such, the content integrity check module 70 may be triggered by power losses to detect discrepancies, restore missing content, and initiate further transfers of content. In this manner, the content integrity check module 70 may allow content to be restored on a data storage entity or may allow a previously initiated transfer of content to be completed without a need to restart the original transfer of data. Further, the content integrity check module 70 may maintain the integrity (e.g., presence and accessibility) of a data storage entity on a vehicle despite unpredictable power losses.

In some implementations, the content integrity check module 70 may also correct other discrepancies or detected inefficiencies of data stored on the data storage entity 68. For example, the content integrity check module 70 may remove any duplicate files or data on the data storage entity 68 and/or the content integrity check module 70 may delete any files or data on the data storage entity 68 that are not indicated in the content inventory 71.

After detecting discrepancies, updating content inventories, and/or restoring data on a storage device, the content integrity check module 70 or 120 may communicate an up-to-date (i.e., updated) content inventory to a computing device external to the vehicle 52 or 102x, such as the data center 105. In this manner, operators of services, such as on-board multimedia services, may maintain records (e.g., at the data center 105) of currently stored content on each of the vehicles 102. Based on these records, operators of services may selectively provide new or different content to each of the vehicles 102, determine the health of data storage entities, etc.

Computing Devices in the on-board/Communications System

Figure 4:
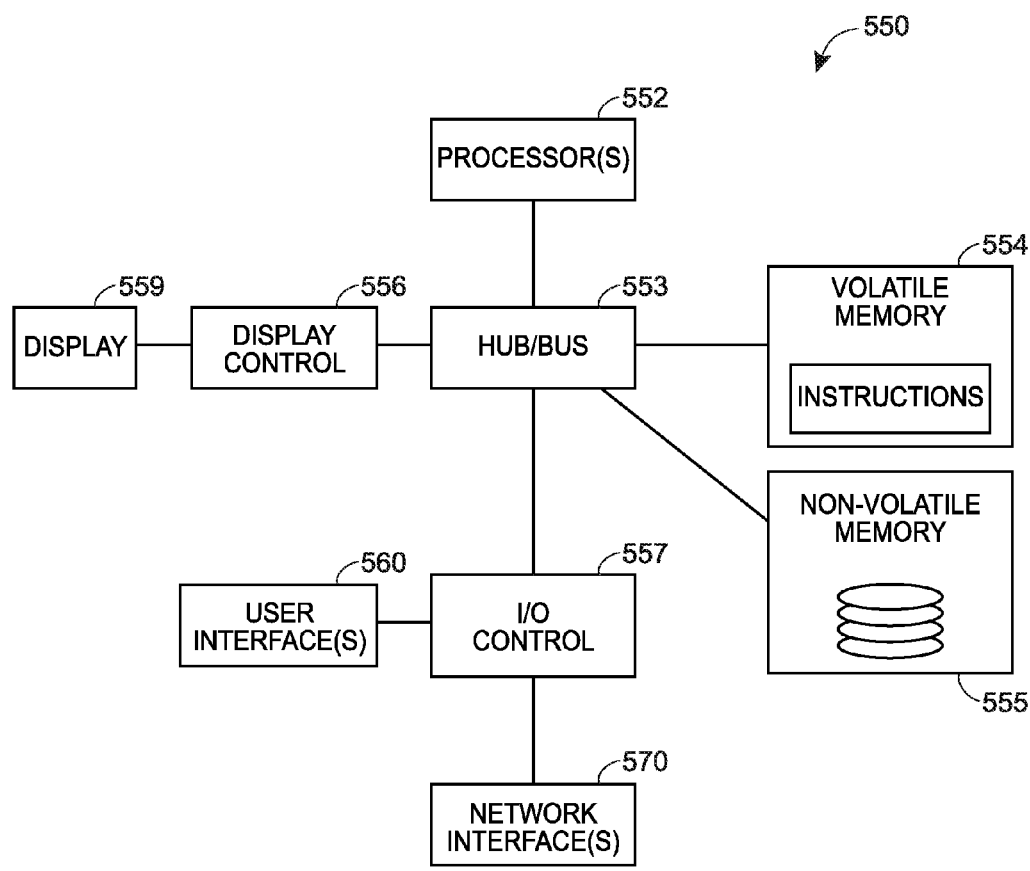
FIG. 4 is a block diagram of an example computing device that may be utilized in a system on-board a vehicle or a communications system, such as the systems illustrated in FIGS. 1 and 2.

FIG. 4 illustrates a block diagram of an example computing device 550 that may be utilized in the onboard system 50 or the communications system 100. For example, one or more computing devices 550 may be particularly configured to be utilized as at least a portion of the data center 105, the vehicle data delivery network 106, the on-board node 120, or the device 118. Additionally, other devices illustrated in FIGS. 1 and 2 such as the cockpit electronics node 62 may include an embodiment of the computing device 550.

The computing device 550 may include, for example, one more central processing units (CPUs) or processors 552, and one or more busses or hubs 553 that connect the processor(s) 552 to other elements of the computing device 550, such as a volatile memory 554, a non-volatile memory 555, a display controller 556, and an I/O controller 557. The volatile memory 554 and the non-volatile memory 555 may each include one or more non-transitory, tangible computer readable storage media such as random access memory (RAM), read only memory (ROM), FLASH memory, a biological memory, a hard disk drive, a digital versatile disk (DVD) disk drive, etc.

In an embodiment, the memory 554 and/or the memory 555 may store instructions 558 that are executable by the processor 552. For example, in a computing device 550 particularly configured to be the on-board node 56, the instructions 558 may be the instructions comprising the content integrity check module 70. In yet another example, in a computing device 550 particularly configured to be a device 118, the instructions 558 may be the Vehicle Travel Application (VTA). Indeed, each of the modules, applications and engines described herein can correspond to a different set of machine readable instructions for performing one or more functions described above. These modules need not be implemented as separate software programs, procedures or modules, and thus various subsets of these modules can be combined or otherwise re-arranged in various embodiments. In some embodiments, at least one of the memories 554, 555 stores a subset of the modules and data structures identified herein. In other embodiments, at least one of the memories 554, 555 stores additional modules and data structures not described herein.

In an embodiment, the display controller 556 may communicate with the processor (s) 552 to cause information to be presented on a connected display device 559. In an embodiment, the I/O controller 557 may communicate with the processor(s) 552 to transfer information and commands to/from the user interface 560, which may include a mouse, a keyboard or key pad, a touch pad, click wheel, lights, a speaker, a microphone, etc. In an embodiment, at least portions of the display device 559 and of the user interface 560 are combined in a single, integral device, e.g., a touch screen. Additionally, data or information may be transferred to and from the computing device 550 via a network interface 570. In some embodiments, the computing device 550 may include more than one network interface 570, such as a wireless interface and a wired interface.

The illustrated computing device 550 is only one example of a computing device suitable to be particularly configured for use in the communications system 100. Other embodiments of the computing device 550 may be also be for use in the communications system 100, even if the other embodiments have more or fewer components than shown in FIG. 4, have one or more combined components, or have a different configuration or arrangement of the components. Moreover, the various components shown in FIG. 4 can be implemented in hardware, a processor executing software instructions, or a combination of both hardware and a processor executing software instructions, including one or more signal processing and/or application specific integrated circuits.

Additional Considerations

Of course, the applications and benefits of the systems, methods and techniques described herein are not limited to only the above examples. Many other applications and benefits are possible by using the systems, methods and techniques described herein.

Furthermore, when implemented, any of the methods and techniques described herein or portions thereof may be performed by executing software stored in one or more non-transitory, tangible, computer readable storage media or memories such as magnetic disks, laser disks, optical discs, semiconductor memories, biological memories, other memory devices, or other storage media, in a RAM or ROM of a computer or processor, etc.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

1. A computer-implemented method for maintaining the integrity of data stored on a storage device being transported by a vehicle, the computer-implemented method comprising:

detecting, by one or more processors, a discrepancy between data stored on the storage device and a content inventory, wherein the content inventory includes indications of a plurality of content that is to be included in the data stored on the storage device;

upon detecting the discrepancy, analyzing, by the one or more processors, the data stored on the storage device to identify specific portions of the plurality of content that are missing from the data stored on the storage device;

updating, by the one or more processors, the content inventory to indicate that the specific portions of the plurality of content are missing from the data stored on the storage device; and restoring, by the one or more processors, the identified specific portions of the plurality of content, wherein the restoring of the specific portions of the plurality of content includes:

receiving the identified specific portions of the plurality of content from a content source, and storing the identified specific portions of the plurality of content on the storage device.

2. The computer-implemented method according to aspect 1, wherein detecting the discrepancy includes comparing an actual size of a plurality of files stored on the storage device to corresponding recorded sizes in the content inventory.

3. The computer-implemented method according to either aspect 1 or aspect 2, wherein the content inventory includes a summary file and a journal file, the summary file including indication of the presence or absence of the plurality of content in the data stored on the storage device, and the journal file including indications of failed or completed transfers of the plurality of content to the storage device.

4. The computer-implemented method according to any one of the preceding aspects, wherein updating the content inventory to indicate that the specific portions of the plurality of content are missing from the data stored on the storage device includes:

updating one or more portions of the summary file to indicate that the specific portions of the plurality of content are not present in the data on the storage device, and updating one or more portions of the journal file to indicate that a transfer of the specific portions of the plurality of content to the storage device failed.

5. The computer-implemented method according to any one of the preceding aspects, further comprising, upon restoring the specific portions of the plurality of content, updating, by the one or more processors, the journal file to indicate that a transfer of the specific portions of the plurality of content to the storage device is completed.

6. The computer-implemented method according to any one of the preceding aspects, further comprising communicating, via a network interface, the updated content inventory to a remote computing device, wherein the remote computing device is external to the vehicle.

7. The computer-implemented method according to any one of the preceding aspects, wherein receiving the specific portions of the plurality of content from the content source includes receiving the portions of the plurality of content from a computing device external to the vehicle via a forward communication link between the vehicle and the computing device.

8. The computer-implemented method according to any one of the preceding aspects, further comprising upon detecting the discrepancy, analyzing, by the one or more processors, the data stored on the storage device to identify one or more files in the data stored on the storage device that are at least one of:

(i) duplicates of other files in the data stored on the storage device, or (ii) not indicated in the content inventory.

9. The computer-implemented method of claim 8, further comprising removing, by the one or more processors, the one or more files from the data stored on the storage device.

10. A system on-board a vehicle comprising:

a storage device storing data to be distributed to passenger on the vehicle;

an on-board node including one or more processors and a non-transitory computer-readable medium, wherein the non-transitory computer-readable medium stores thereon instructions that, when executed by the one or more processors, cause the on-board node to:

detect a discrepancy between the data stored on the storage device and a content inventory, wherein the content inventory includes indications of a plurality of content that is to be included in the data stored on the storage device, upon detecting the discrepancy, analyze the data stored on the storage device to identify specific portions of the plurality of content that are missing from the data stored on the storage device, update the content inventory to indicate that the identified specific portions of the plurality of content are missing from the data stored on the storage device, and restore the identified specific portions of the plurality of content, wherein the restoring of the identified specific portions of the plurality of content includes:

receiving the identified specific portions of the plurality of content from a content source, and storing the identified specific portions of the plurality of content on the storage device.

11. The system of aspect 10, wherein the plurality of content includes multimedia content to be distributed to passengers on the vehicle.

12. The system of either aspect 10 or aspect 11, wherein the instructions cause the on-board node to detect a discrepancy between the data stored on the storage device and the content inventory upon an initialization of the on-board node.

13. The system according to any one of aspects 10 to 12, wherein the instructions cause the on-board node to detect a discrepancy between the data stored on the storage device and the content inventory after detecting a loss of power to the storage device.

14. The system according to any one of aspects 10 to 13, wherein the content source is a portable device storing the plurality of content and removably attached to the on-board node.

15. The system according to any one of aspects 10 to 14, wherein the instructions cause the on-board node to detect a discrepancy between the data stored on the storage device and the content inventory at least one of periodically or at pre-defined times while the vehicle is moving.

16. A non-transitory computer-readable medium storing thereon instructions that, when executed on one or more processors of a computing device, cause the one or more processors to:

detect a discrepancy between data stored on a storage device and a content inventory, wherein the content inventory includes indications of a plurality of content that is to be included in the data stored on the storage device, upon detecting the discrepancy, analyze the data stored on the storage device to identify specific portions of the plurality of content that are missing from the data stored on the storage device, update the content inventory to indicate that the identified specific portions of the plurality of content are missing from the data stored on the storage device, and restore the identified specific portions of the plurality of content, wherein the restoring of the identified specific portions of the plurality of content includes:

receiving the identified specific portions of the plurality of content from a content source, and storing the identified specific portions of the plurality of content on the storage device.

17. The non-transitory computer-readable medium of aspect 16, wherein detecting the discrepancy between the data stored on the storage device and the content inventory includes comparing file names of the data stored on the storage device with file names indicated in the content inventory.

18. The non-transitory computer-readable medium of either aspect 15 or aspect 16, wherein detecting the discrepancy between the data stored on the storage device and the content inventory includes comparing file types of the data stored on the storage device with file types indicated in the content inventory.

19. The non-transitory computer-readable medium according to any one of aspects 16 to 18, wherein the instructions further cause the one or more processors to communicate, via a network interface, the updated content inventory to a data center, wherein the data center is external to a vehicle transporting the computing device and the storage device.

20. The non-transitory computer-readable medium according to any one of aspects 16 to 19, wherein the instructions further cause the one or more processors to communicate the updated content inventory to the data center while the vehicle is moving with respect to the data center.

What is claimed is:

1. A computer-implemented method for maintaining the integrity of data stored on a storage device being transported by a vehicle, the computer-implemented method comprising:
performing, by one or more processors, an initial check of data stored on the storage device, wherein performing the initial check includes detecting a discrepancy between the data stored on the storage device and a content inventory by comparing information recorded in the content inventory with one or more of (i) file sizes, (ii) file names, or (iii) file types of a plurality of files stored on the storage device, and wherein the content inventory includes indications of a plurality of content that is to be included in the data stored on the storage device;
after performing the initial check and in response to detecting the discrepancy, analyzing, by the one or more processors, the data stored on the storage device to identify specific portions of the plurality of content that are missing from the data stored on the storage device;
updating, by the one or more processors, the content inventory to indicate that the specific portions of the plurality of content are missing from the data stored on the storage device; and
restoring, by the one or more processors, the identified specific portions of the plurality of content, wherein the restoring of the specific portions of the plurality of content includes:
receiving the identified specific portions of the plurality of content from a content source, and
storing the identified specific portions of the plurality of content on the storage device.

2. The computer-implemented method of claim 1, wherein detecting the discrepancy includes comparing file sizes of the plurality of files stored on the storage device to corresponding recorded sizes in the content inventory.

3. The computer-implemented method of claim 1, wherein the content inventory includes a summary file and a journal file,
the summary file including an indication of the presence or absence of the plurality of content in the data stored on the storage device, and
the journal file including indications of failed or completed transfers of the plurality of content to the storage device.

4. The computer-implemented method of claim 3, wherein updating the content inventory to indicate that the specific portions of the plurality of content are missing from the data stored on the storage device includes:
updating one or more portions of the summary file to indicate that the specific portions of the plurality of content are not present in the data on the storage device, and
updating one or more portions of the journal file to indicate that a transfer of the specific portions of the plurality of content to the storage device failed.

5. The computer-implemented method of claim 3, further comprising, upon restoring the specific portions of the plurality of content, updating, by the one or more processors, the journal file to indicate that a transfer of the specific portions of the plurality of content to the storage device is completed.

6. The computer-implemented method of claim 1, further comprising communicating, via a network interface, the updated content inventory to a remote computing device, wherein the remote computing device is external to the vehicle.

7. The computer-implemented method of claim 1, wherein receiving the specific portions of the plurality of content from the content source includes receiving the portions of the plurality of content from a computing device external to the vehicle via a forward communication link between the vehicle and the computing device.

8. The computer-implemented method of claim 1, further comprising upon detecting the discrepancy, analyzing, by the one or more processors, the data stored on the storage device to identify one or more files in the data stored on the storage device that are at least one of:
(i) duplicates of other files in the data stored on the storage device, or
(ii) not indicated in the content inventory.

9. The computer-implemented method of claim 8, further comprising removing, by the one or more processors, the one or more files from the data stored on the storage device.

10. A system on-board a vehicle comprising:
a storage device storing data to be distributed to passenger on the vehicle;
an on-board node including one or more processors and a non-transitory computer-readable medium, wherein the non-transitory computer-readable medium stores thereon instructions that, when executed by the one or more processors, cause the on-board node to:
perform an initial check of the data stored on the storage device, wherein performing the initial check includes detecting a discrepancy between the data stored on the storage device and a content inventory by comparing information recorded in the content inventory with one or more of (i) file sizes, (ii) file names, or (iii) file types of a plurality of files stored on the storage device, and wherein the content inventory includes indications of a plurality of content that is to be included in the data stored on the storage device,
after performing the initial check and in response to detecting the discrepancy, analyze the data stored on the storage device to identify specific portions of the plurality of content that are missing from the data stored on the storage device,
update the content inventory to indicate that the identified specific portions of the plurality of content are missing from the data stored on the storage device, and restore the identified specific portions of the plurality of content, wherein the restoring of the identified specific portions of the plurality of content includes:
    receiving the identified specific portions of the plurality of content from a content source, and
    storing the identified specific portions of the plurality of content on the storage device.

11. The system of claim 10, wherein the plurality of content includes multimedia content to be distributed to passengers on the vehicle.

12. The system of claim 10, wherein the instructions cause the on-board node to perform the initial check upon an initialization of the on-board node.

13. The system of claim 10, wherein the instructions cause the on-board node to perform the initial check after detecting a loss of power to the storage device.

14. The system of claim 10, wherein the content source is a portable device storing the plurality of content and removably attached to the on-board node.

15. The system of claim 10, wherein the instructions cause the on-board node to perform initial checks at least one of periodically or at pre-defined times while the vehicle is moving.

16. A non-transitory computer-readable medium storing thereon instructions that, when executed on one or more processors of a computing device, cause the one or more processors to:
    perform an initial check of data stored on a storage device, wherein performing the initial check includes detecting a discrepancy between the data stored on the storage device and a content inventory by comparing information recorded in the content inventory with one or more of (i) file sizes, (ii) file names, or (iii) file types of a plurality of files stored on the storage device, and wherein the content inventory includes indications of a plurality of content that is to be included in the data stored on the storage device,
    after performing the initial check and in response to detecting the discrepancy, analyze the data stored on the storage device to identify specific portions of the plurality of content that are missing from the data stored on the storage device,
    update the content inventory to indicate that the identified specific portions of the plurality of content are missing from the data stored on the storage device, and
    restore the identified specific portions of the plurality of content, wherein the restoring of the identified specific portions of the plurality of content includes:
        receiving the identified specific portions of the plurality of content from a content source, and
        storing the identified specific portions of the plurality of content on the storage device.

17. The non-transitory computer-readable medium of claim 16, wherein detecting the discrepancy between the data stored on the storage device and the content inventory includes comparing file names of the data stored on the storage device with file names indicated in the content inventory.

18. The non-transitory computer-readable medium of claim 17, wherein the instructions further cause the one or more processors to communicate the updated content inventory to the data center while the vehicle is moving with respect to the data center.

19. The non-transitory computer-readable medium of claim 16, wherein detecting the discrepancy between the data stored on the storage device and the content inventory includes comparing file types of the data stored on the storage device with file types indicated in the content inventory.

20. The non-transitory computer-readable medium of claim 16, wherein the instructions further cause the one or more processors to communicate, via a network interface, the updated content inventory to a data center, wherein the data center is external to a vehicle transporting the computing device and the storage device.

\* \* \* \* \*